US010870253B2

(12) United States Patent
Deplace et al.

(10) Patent No.: US 10,870,253 B2
(45) Date of Patent: Dec. 22, 2020

(54) MULTI-LAYER FILMS AND ARTICLES MADE THEREFROM

(71) Applicant: Dow Global Technologies LLC, Midland, MI (US)

(72) Inventors: Fanny Deplace, Freeport, TX (US); Hongming Ma, Freeport, TX (US); Brian W. Walther, Freeport, TX (US); Thomas Allgeuer, Horgen (CH); Peter H. R. Sandkuehler, Horgen (CH); Antonio Manrique, Tarragona (ES); Claudia Hernandez, Freeport, TX (US); Angels Domenech, Tarragona (ES); Lamy J. Chopin, III, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 707 days.

(21) Appl. No.: 15/301,378

(22) PCT Filed: Apr. 1, 2015

(86) PCT No.: PCT/US2015/023925
§ 371 (c)(1),
(2) Date: Oct. 1, 2016

(87) PCT Pub. No.: WO2015/153794
PCT Pub. Date: Oct. 8, 2015

(65) Prior Publication Data
US 2017/0182728 A1  Jun. 29, 2017

Related U.S. Application Data

(60) Provisional application No. 61/973,448, filed on Apr. 1, 2014.

(51) Int. Cl.
*B32B 27/08* (2006.01)
*B32B 1/02* (2006.01)
*B32B 7/12* (2006.01)
*B32B 27/32* (2006.01)
*B29C 65/00* (2006.01)
*B32B 27/30* (2006.01)

(52) U.S. Cl.
CPC ............. *B32B 1/02* (2013.01); *B29C 65/004* (2013.01); *B32B 7/12* (2013.01); *B32B 27/08* (2013.01); *B32B 27/30* (2013.01); *B32B 27/32* (2013.01); *B32B 2250/242* (2013.01); *B32B 2307/51* (2013.01); *B32B 2307/7244* (2013.01); *B32B 2439/00* (2013.01); *B32B 2439/06* (2013.01); *B32B 2439/46* (2013.01)

(58) Field of Classification Search
CPC ....... B29C 65/004; B32B 27/08; B32B 27/32; B32B 27/30; B32B 1/02; B32B 2439/00; B32B 2307/51; B32B 2250/242; B32B 2439/46; B32B 2439/06; B32B 2307/7244

See application file for complete search history.

(56) References Cited

U.S. PATENT DOCUMENTS

| | | |
|---|---|---|
| 5,504,172 A | 4/1996 | Imuta et al. |
| 6,054,544 A | 4/2000 | Finlayson et al. |
| 6,335,410 B1 | 1/2002 | Finlayson et al. |
| 6,525,157 B2 | 2/2003 | Cozewith et al. |
| 6,723,810 B2 | 4/2004 | Finlayson et al. |
| 6,960,635 B2 | 11/2005 | Stevens et al. |
| 8,835,567 B2 | 9/2014 | Demirors et al. |
| 2006/0199914 A1* | 9/2006 | Harris ................. C08F 210/16 525/242 |
| 2010/0029827 A1* | 2/2010 | Ansems ................ B32B 27/08 524/451 |
| 2010/0272936 A1* | 10/2010 | White .................... B32B 27/08 428/35.4 |
| 2013/0046061 A1* | 2/2013 | Hermel-Davidock ....................... C08F 10/00 525/240 |
| 2013/0092723 A1* | 4/2013 | Bensason ............... B32B 27/32 229/87.03 |

FOREIGN PATENT DOCUMENTS

| | | |
|---|---|---|
| CN | 1242029 | 1/2000 |
| EP | 0628593 | 12/1994 |
| WO | WO 00/1745 | 1/2000 |
| WO | WO 2009/067337 | 5/2009 |
| WO | WO 2014/012250 | 1/2014 |

OTHER PUBLICATIONS

PCT Search Report dated Jun. 17, 2005; from counterpart PCT Application No. PCT/US15/23925.
PCT IPRP dated Oct. 4, 2016; from counterpart PCT Application No. PCT/US15/23925.
EP Office Action dated Nov. 22, 2016; from EP counterpart Application No. 15716682.8.

* cited by examiner

*Primary Examiner* — Samir Shah
(74) *Attorney, Agent, or Firm* — Brooks, Cameron & Huebsch, PLLC

(57) ABSTRACT

A multilayer film comprising a first layer comprising from greater than 0 to 100 percent by weight of an ethylene/α-olefin interpolymer composition (LLDPE), based on the total weight of the film composition; and a second layer comprising at least 5 percent by weight of the second layer, of an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min; and from 60 to 95 percent, by weight of the second layer, of EVOH is provided.

13 Claims, No Drawings

MULTI-LAYER FILMS AND ARTICLES MADE THEREFROM

FIELD OF INVENTION

The instant invention relates to a multi-layer film and articles made therefrom.

BACKGROUND OF THE INVENTION

Packaging materials, such as polyethylene terephthalate (PET) liquid bottles, used in various applications require good $CO_2$ and/or vapor barrier properties. One manner of improving barrier properties involves using thicker materials. Thicker packaging materials, however, raise packaging and transportation costs.

Stretch sleeves are frequently used on packaging materials, and particularly on bottles. It would be desirable to use a stretch sleeve which would provide gas barrier properties so that the packaging gauge may be reduced while maintaining barrier properties.

Other flexible barrier packaging materials and formats, such as bags, flowpacks, pillow and stand-up pouches made with ethylene vinyl alcohol (EVOH) for its excellent gas barrier, have a decrease in the abuse resistance due to the brittleness of the EVOH. Multi-layer films where EVOH is a continuous layer are known to have excellent barrier properties. However, when the film is elongated the EVOH tends to crack and allow significant egress of oxygen and other volatile components to pass.

The use of EVOH as a barrier resin has extended from flexible food packaging into a number of applications such as a hydrocarbon barrier in plastic gasoline tanks for automobiles, an oxygen barrier in silage wrap, and a chemical barrier in agricultural films. While EVOH provides excellent barrier properties in these flexible applications, EVOH is easily cracked when repeatedly flexed resulting in significant degradation in the barrier properties of the article and ultimately leading to the premature degradation of the contents of the package.

In the field of animal food conservation/storage silo bags/silage bales play an increasing role and like in other "food" applications, quality and shelf life are a critical factor for productivity and cost. The current system of silage bale wrapping with a 25 micron stretch film is economic; however, due to the nature of the film and technology, the barrier performance with respect to oxygen is very limited. Specifically, migration through the thin polyethylene film, between the wrapping layers and through small puncture holes negatively affect the quality of the baled animal feed during storage.

It would be desirable to have a flexible packaging material having a combination of good flexibility and excellent barrier properties.

SUMMARY OF THE INVENTION

The instant invention is a multi-layer film and articles made therefrom.

In one embodiment, the instant invention provides a multi-layer film comprising (1) a first layer which comprises from greater than 0 to 100 percent by weight of the first layer of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (2) a second layer which comprises (a) at least 5 percent, by weight of the second layer, of an anhydride and/or carboxylic acid functionalized ethylene/alpha-olefin interpolymer having a density in the range of from 0.855 to 0.900 g/cm³; and having a melt index (190° C./2.16 kg) of greater than 200 g/10 min; and (b) at least 60 percent, by weight of the second layer, of ethylene vinyl alcohol (EVOH).

DETAILED DESCRIPTION OF THE INVENTION

The instant invention is a multi-layer film and articles made therefrom.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), copolymer and interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/alpha-olefin interpolymer," as used herein, refers to an interpolymer that comprises, in polymerized form, a majority amount of ethylene monomer (based on the weight of the interpolymer), and one or more additional alpha-olefin monomers. The term "ethylene/alpha-olefin interpolymer" includes ethylene/alpha-olefin copolymers, as well as terpolymers and other polymers derived from multiple monomers.

The term, "ethylene/alpha-olefin copolymer," as used herein, refers to a copolymer that comprises, in polymerized form, a majority amount of ethylene monomer (based on the weight of the copolymer), and an alpha-olefin, as the only two monomer types.

The term, "EVOH" as used herein, refers to a polymer comprising repeating units of ethylene and vinyl alcohol. As is generally known in the art the weight ratio of the ethylene to vinyl alcohol defines the barrier properties to gases such as $O_2$ and $CO_2$. Such polymers and their methods of manufacture are generally known in the art.

As used herein the term "film" refers to a sheet, laminate, web or the like or combinations thereof, having length and breadth dimensions and having two major surfaces with a thickness there between. A film can be a monolayer film (having only one layer) or a multilayer film (having two or more layers). A film, in most instances, has a thickness of up to about 20 mils ($5 \times 10^{-4}$ m). The term "multilayer film" means a film having two or more layers. A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating. A film, in most instances, has a thickness of up to about 30-35 mils (7.5-$8 \times 10^{-4}$ m).

The term "tie layer" or "adhesive layer" or "bonding layer" means an inner layer having a primary purpose of providing interlayer adhesion to directly adjacent or contiguous layers, for instance between the interlayer and a glass. The tie layer may also impart other characteristics to the multicomponent structure of which it is a part.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The multi-layer film according to the invention comprises (1) a first layer which comprises from greater than 0 to 100 percent by weight of the first layer of an ethylene/α-olefin interpolymer composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (2) a second layer which comprises (a) at least 5 percent, by weight of the second layer, of an anhydride and/or carboxylic acid functionalized ethylene/alpha-olefin interpolymer having a density in the range of from 0.855 to 0.900 g/cm³; and having a melt index (190° C./2.16 kg) of greater than 200 g/10 min; and (b) at least 60 percent, by weight of the second layer, of ethylene vinyl alcohol (EVOH).

In yet another embodiment, the invention provides films containing a layer comprising an EVOH-based resin made by compounding into the EVOH from 5 wt % to 10 wt % of an additive which is an ultra-low viscosity maleic anhydride-(MAH) grafted ultra-low density polymer. The ultra-low viscosity maleic anhydride-coupled ultra-low density polymer is produced by maleic anhydride (MAH) coupling of an ethylene/1-octene copolymer having melt index of 1250 g/10 min (calculated value from viscosity) and a density of 0.870 g/cc to produce a grafted polymer with from 0.5 to 2% bound maleic anhydride and a melt index of from 200 to 1000 g/10 min. nominally 1.1% bound MAH and a melt index of 600 g/10 min. All individual values and subranges from 5 to 10 wt % additive are included and disclosed herein; for example the amount of additive may range from a lower limit of 5, 6, 7. 8 or 9 wt % to an upper limit of 6, 7, 8, 9 or 10 wt %. For example, the amount of additive can be from 5 to 10 wt %, or in the alternative, from 5 to 7 wt % or in the alternative, from 7 to 10 wt %, or in the alternative, from 6 to 9 wt %. All individual values and subranges from 0.5 to 2% bound MAH are included and disclosed herein; for example, the amount of bound MAH may range from a lower limit of 0.5, 1, 1.1, 1.5, or 1.7% to an upper limit of 1, 1.2, 1.8 or 2 wt % In a particular embodiment, the additive has 1.1% bound MAH. All individual values and subranges of a melt index of from 200 to 1000 g/10 min are disclosed and included herein; for example the additive may have a melt index which ranges from a lower limit of 200, 400, 600 or 800 g/10 min to an upper limit of 300, 500, 700, 900 or 1000 g/10 min. IN a particular embodiment, the additive has a melt index of 600 g/10 min.

In yet another embodiment, the present disclosure provides a stetch hood film according to any embodiment described herein, wherein such stretch hood film is used as an additional layer in animal food, storage silo, and/or silage bale packaging. In order to address the oxygen ingress through gaps between the wrapping layers in such packaging, a double hooding process may be employed where such a bale is hooded with an embodiment of the inventive films, turned around and hooded from the other side with an embodiment of the inventive film in order to have 4 sides (or cylinder surface for round bale) of the bale are covered by two solid plies of inventive film, the bottom and top side each by 1 layer of an embodiment of the inventive film.

Ethylene/α-Olefin Interpolymer Composition

The first layer comprises from greater than 0 to 100 percent by weight of an ethylene-based interpolymer composition. All individual values and subranges from greater than 0 to 100 percent by weight of an ethylene/α-olefin interpolymer composition are included herein and disclosed herein; for example, the amount of the ethylene/α-olefin interpolymer composition in the film composition can be from a lower limit of 0.5, 1, 5, 15, 25, 35, 45, 55, 65, 75, 85 or 95 percent by weight to an upper limit of 2, 10, 20, 30, 40, 50, 60, 70, 80, 90 or 100 percent by weight. For example, the amount of the ethylene/α-olefin interpolymer composition in the film composition may be in the range of from greater than 0 to 100 percent by weight, or in the alternative, the amount of the ethylene/α-olefin interpolymer composition in the film composition may be in the range of from 25 to 75 percent by weight, or in the alternative, the amount of the ethylene/α-olefin interpolymer composition in the film composition may be in the range of from 15 to 65 percent by weight, or in the alternative, the amount of the ethylene/α-olefin interpolymer composition in the film composition may be in the range of from 40 to 70 percent by weight, or in the alternative, the amount of the ethylene/α-olefin interpolymer composition in the film composition may be in the range of from 5 to 65 percent by weight.

The ethylene/α-olefin interpolymer composition (linear low density polyethylene (LLDPE)) comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected, for example, from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant (CDC) in the range of from greater than from 75 to 200. All individual values and subranges from 75 to 200 are disclosed herein and included herein; for example, the CDC can be from a lower limit of 75, 95, 115, 135, 155, 175 or 195 to an upper limit of 80, 100, 120, 140, 160, 180 or 200. For example, the CDC may be in the range of from 75 to 200, or in the alternative, the CDC may be in the range of from 85 to 150, or in the alternative, the CDC may be in the range of from 85 to 125, or in the alternative, the CDC may be in the range of from 75 to 175.

The ethylene/α-olefin interpolymer composition is characterized by having a zero shear viscosity ratio (ZSVR) of at least 2. All individual values and subranges from at least 2 are included herein and disclosed herein; for example, the ZSVR can be from a lower limit of 2, or in the alternative, from a lower limit of 5, or in the alternative, from a lower limit of 8, or in the alternative from a lower limit of 10. In yet an alternative embodiment, the ZSVR is equal to or less than 50. All individual values and subranges are included herein and disclosed herein; for example, the ZSVR is from an upper limit of 50, or in the alternative, from an upper limit of 40, or in the alternative, from an upper limit of 30, or in the alternative, from an upper limit of 20. In yet alternative embodiments, the ZSVR may be in the range from 2 to 50, or in the alternative, from 2 to 20, or in the alternative, from 2 to 10, or in the alternative, from 2 to 6, or in the alternative, from 2.5 to 4.

The ethylene/α-olefin interpolymer composition has a density in the range of 0.865 to 0.930 g/cm$^3$. All individual values and subranges from 0.865 to 0.930 g/cm$^3$ are included herein and disclosed herein; for example, the density of the ethylene/α-olefin interpolymer composition can be from a lower limit of 0.865, 0.875, 0.885, 0.895, 0.905, 0.915, or 0.925 g/cm$^3$ to an upper limit of 0.87, 0.88, 0.89, 0.9, 0.91, 0.92 or 0.93 g/cm$^3$. For example, the density may be in the range of from 0.865 to 0.930 g/cm$^3$, or in the alternative, the density may be in the range of from 0.903 to 0.930 g/cm$^3$, or in the alternative, the density may be in the range of from 0.865 to 0.910 g/cm$^3$, or in the alternative, the density may be in the range of from 0.89 to 0.930 g/cm$^3$.

The ethylene/α-olefin interpolymer composition has a melt index (I$_2$) from 0.1 to 5 g/10 minutes. All individual values and ranges from 0.1 to 5 g/10 minutes are included herein and disclosed herein; for example, the I$_2$ can be from a lower limit of 0.1, 1, 1.5, 2, 2.5, 3, 3.5, 4, or 4.5 g. 10 minutes to an upper limit of 0.5, 1.2, 1.7, 2.2, 2.7, 3.2, 3.7, 4.2, 4.7 or 5 g/10 minutes. For example, the melt index (I$_2$) may be in the range of from 0.1 to 5 g/10 minutes, or in the alternative, melt index (I$_2$) may be in the range of from 0.9 to 2.5 g/10 minutes, or in the alternative, melt index (I$_2$) may be in the range of from 2.5 to 5 g/10 minutes, or in the alternative, melt index (I$_2$) may be in the range of from 1.4 to 3.4 g/10 minutes, or in the alternative, melt index (I$_2$) may be in the range of from 1.75 to 3.75 g/10 minutes, or in the alternative.

In an alternative embodiment, the ethylene/α-olefin interpolymer composition has a molecular weight distribution (M$_w$/M$_n$) in the range of from 1.8 to 6. For example, the molecular weight distribution (M$_w$/M$_n$) can be from a lower limit of 1.8, 2.2, 3.4, 4.6, 5.8 to an upper limit of 2.5, 3.7, 4.8, 5.6 or 6.

In an alternative embodiment, the ethylene/α-olefin interpolymer composition has a molecular weight (M$_w$) in the range of 50,000 to 250,000 daltons. For example, the molecular weight (M$_w$) can be from a lower limit of 50,000, 60,000, 70,000 daltons to an upper limit of 150,000, 180, 000, 200,000 or 250,000 daltons.

The ethylene/α-olefin interpolymer composition has less than 120 total unsaturation units/1,000,000 carbons present in the ethylene-based polymer composition. All individual values and subranges are included herein and disclosed herein; for example, the total unsaturation units per one million carbons can be from an upper limit of 120, 110, 100, 90 or 80 units. In an alternative embodiment, the ethylene/α-olefin interpolymer composition has less than 120 total unsaturation units/1,000,000 carbons has a lower limit of 10, 20, 30, 40, 50, 60, 70, or 79 units The ethylene/α-olefin interpolymer composition has a long chain branching frequency in the range of from 0.01 to 3 long chain branches (LCB) per 1000 carbons. All individual values and subranges from 0.1 to 3 LCB per 1000 carbons are included herein an disclosed herein; for example the long chain branching frequency can be from a lower limit of 0.01, 0.1, 0.5, 1, 1.5, 2, or 2.5 LCB per 1000 carbons to an upper limit of 0.06, 0.5, 1.4, 1.9, 2, 2.4, 2.9 or 3 LCB per 1000 carbons. For example, the long chain branching frequency may be in the range from 0.01 to 3 long chain branches (LCB) per 1000 carbons, or in the alternative, the long chain branching frequency may be in the range from 1.5 to 3 long chain branches (LCB) per 1000 carbons, or in the alternative, the long chain branching frequency may be in the range from 0.01 to 1.5 long chain branches (LCB) per 1000 carbons, or in the alternative, the long chain branching frequency may be in the range from 1 to 2 long chain branches (LCB) per 1000 carbons, or in the alternative, the long chain branching frequency may be in the range from 0.5 to 2.5 long chain branches (LCB) per 1000 carbons.

The ethylene/α-olefin interpolymer composition may further comprise additional components such as one or more other polymers and/or one or more additives. Such additives include, but are not limited to, antistatic agents, color enhancers, dyes, lubricants, fillers such as TiO$_2$ or CaCO$_3$, opacifiers, nucleators, processing aids, pigments, primary antioxidants, secondary antioxidants, processing aids, UV stabilizers, anti-blocks, slip agents, tackifiers, anti-static agents, fire retardants, anti-microbial agents, odor reducer agents, anti-fungal agents, and combinations thereof. The ethylene-based polymer composition may contain from about 0.1 to about 10 percent by the combined weight of such additives, based on the weight of the ethylene-based polymer composition including such additives.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

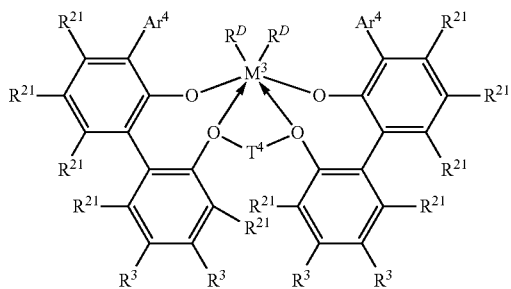

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename ISOPAR E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (ISOPAR E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

Propylene/α-Olefin Interpolymer Composition

In one embodiment, the first layer further comprises from 25 to 95 percent by weight of a propylene/α-olefin interpolymer composition, based on the total weight of the film composition. All individual values and subranges from 25 to 95 percent by weight are included herein and disclosed herein; for example, the amount of the propylene/α-olefin interpolymer composition in the film composition can range from a lower limit of 25, 35, 45, 55, 65, 75, 85, or 90 percent by weight to an upper limit of 30, 40, 50, 60, 70, 80, 90 or 95 percent by weight. For example, the amount of propylene/α-olefin interpolymer composition in the film composition may be from 25 to 95 percent by weight, or in the alternative, the amount of propylene/α-olefin interpolymer composition in the film composition may be from 25 to 75 percent by weight, or in the alternative, the amount of propylene/α-olefin interpolymer composition in the film composition may be from 25 to 50 percent by weight, or in the alternative, the amount of propylene/α-olefin interpolymer composition in the film composition may be from 30 to 60 percent by weight, or in the alternative, the amount of propylene/α-olefin interpolymer composition in the film composition may be from 20 to 70 percent by weight, or in the alternative, the amount of propylene/α-olefin interpolymer composition in the film composition may be from 25 to 80 percent by weight.

In a particular embodiment, the first layer further comprises from greater than 0 to 95 percent by weight of the propylene/α-olefin interpolymer composition.

The propylene/α-olefin interpolymer composition comprises a propylene/alpha-olefin copolymer and/or a propylene/ethylene/butene terpolymer, and may optionally further comprise one or more polymers, e.g. a random copolymer polypropylene (RCP). In one particular embodiment, the propylene/α-olefin copolymer is characterized as having substantially isotactic propylene sequences. "Substantially isotactic propylene sequences" means that the sequences have an isotactic triad (mm) measured by $^{13}C$ NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}C$ NMR spectra.

The propylene/alpha-olefin copolymer comprises from 1 to 40 percent by weight of one or more α-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/α-olefin copolymer comprises from 1 to 35 percent by weight of one or more α-olefin comonomers; or in the alternative, the propylene/α-olefin copolymer comprises from 1 to 30 percent by weight of one or more α-olefin comonomers; or in the alternative, the propylene/α-olefin copolymer comprises from 3 to 27 percent by weight of one or more α-olefin comonomers; or in the alternative, the propylene/α-olefin copolymer comprises from 3 to 20 percent by weight of one or more α-olefin comonomers; or in the alternative, the propylene/α-olefin copolymer comprises from 3 to 15 percent by weight of one or more α-olefin comonomers.

The propylene/α-olefin interpolymer has a crystallinity in the range of from 1 percent by weight to 30 percent by weight. All individual values and subranges from 1 to 30 percent by weight are included herein and disclosed herein; for example, the crystallinity can range from a lower limit of 1, 5, 15, 20, or 25 percent by weight to an upper limit of 2, 6, 16, 26, or 30 percent by weight. For example, the crystallinity of the propylene/α-olefin interpolymer may be from 1 to 30 percent by weight, or in the alternative, the crystallinity of the propylene/α-olefin interpolymer may be from 1 to 15 percent by weight, or in the alternative, the crystallinity of the propylene/α-olefin interpolymer may be from 15 to 30 percent by weight, or in the alternative, the crystallinity of the propylene/α-olefin interpolymer may be from 10 to 20 percent by weight, or in the alternative, the crystallinity of the propylene/α-olefin interpolymer may be from 5 to 25 percent by weight.

The propylene/α-olefin interpolymer has a heat of fusion in the range of from 2 Joules/gram to 50 Joules/gram. All individual values and subranges from 2 to 50 Joules/gram are included herein and disclosed herein; for example, the heat of fusion can range from a lower limit of 2, 10, 20, 30 40 or 45 Joules/gram to an upper limit of 5, 15, 25, 35, 45, or 50 Joules/gram. For example, the heat of fusion of the propylene/α-olefin interpolymer may be from 2 to 50 Joules/gram, or in the alternative, the heat of fusion of the propylene/α-olefin interpolymer may be from 2 to 25 Joules/gram, or in the alternative, the heat of fusion of the propylene/α-olefin interpolymer may be from 2 to 30 Joules/gram, or in the alternative, the heat of fusion of the propylene/α-olefin interpolymer may be from 12 to 25 Joules/gram, or in the alternative, the heat of fusion of the propylene/α-olefin interpolymer may be from 15 to 30 Joules/gram.

The propylene/α-olefin interpolymer has a DSC melting point in the range of 25 to 110° C. All individual values and subranges from 25 to 110° C. are included herein and disclosed herein; for example, the DSC melting point can range from a lower limit of 25, 35, 45, 55, 65, 75, 85, 95 or 105° C. to an upper limit of 30, 40, 50, 60, 70, 80, 90, 100, or 110° C. For example, the DSC melting point may be from 25 to 110° C., or in the alternative, the DSC melting point may be from 50 to 110° C., or in the alternative, the DSC melting point may be from 25 to 60° C., or in the alternative, the DSC melting point may be from 45 to 90° C., or in the alternative, the DSC melting point may be from 35 to 105° C., or in the alternative, the DSC melting point may be from 45 to 75° C.

In an alternative embodiment, the propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 15 g/10 minutes.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Propylene/alpha-olefin interpolymers useful in embodiments of the film composition are further described in details in the U.S. Pat. Nos. 6,960,635 and 6,525,157, incorporated herein by reference. Such propylene/alpha-olefin copolymers are commercially available from The Dow Chemical Company, under the tradename VERSIFY, or from Exxon-Mobil Chemical Company, under the tradename VISTAMAXX.

In one embodiment, the propylene/α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/α-olefin copolymer is not critical, but typically it does not exceed 3 long chain branches/1000 total carbons. The term long chain branch, as used herein with regard to propylene/α-olefin copolymers, refers to a chain length of at least one (1) carbon more than a short chain branch, and short chain branch, as used herein with regard to propylene/α-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/α-olefin copolymers are further described in details in the U.S. Provisional Patent Application No. 60/988,999 and International Patent Application No. PCT/US08/082599, each of which is incorporated herein by reference.

The propylene/α-olefin interpolymer composition may further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The propylene/α-olefin interpolymer composition may contain any amounts of additives. The propylene/α-olefin composition may compromise from about 0 to about 20 percent by the combined weight of such additives, based on the weight of the propylene/α-olefin interpolymer composition and the one or more additives.

Anhydride and/or Carboxylic Acid Functionalized Ethylene/α-Olefin Interpolymer

The second layer comprises from 5 to 40 percent, by weight of the second layer, of an anhydride and/or carboxylic acid functionalized ethylene/α-olefin interpolymer having a density in the range of from 0.855 to 0.900 g/cm³; and having a melt index (190° C./2.16 kg) of greater than 200 g/10 min. All individual values and subranges from 5 to 40 percent by weight are included herein and disclosed herein; for example the amount of anhydride and/or carboxylic acid functionalized ethylene/α-olefin interpolymer in the second layer may range from a lower limit of 5, 15, 25, or 35 percent by weight to an upper limit of 10, 20, 30 or 40 percent by weight. For example, the amount of anhydride and/or carboxylic acid functionalized ethylene/α-olefin interpolymer in the second layer can be from 5 to 40 percent by weight, or in the alternative, the amount of anhydride and/or carboxylic acid functionalized ethylene/α-olefin interpolymer in the second layer can be from 5 to 25 percent by weight, or in the alternative, the amount of anhydride and/or carboxylic acid functionalized ethylene/α-olefin interpolymer in the second layer can be from 25 to 40 percent by weight, or in the alternative, the amount of anhydride and/or carboxylic acid functionalized ethylene/α-olefin interpolymer in the second layer can be from 15 to 30 percent by weight.

The anhydride and/or carboxylic acid functionalization can be any material having the anhydride or carboxylic acid functionality as is generally known in the art. In one embodiment, maleic anhydride is used to functionalize the ethylene/α-olefin interpolymer.

The ethylene/α-olefin interpolymer component of the anhydride and/or carboxylic acid functionalized ethylene/α-olefin interpolymer can be any ethylene/α-olefin interpolymer as discussed above in the section titled Ethylene/α-Olefin Interpolymer Composition.

The anhydride and/or carboxylic acid functionalized ethylene/α-olefin interpolymer has a density in the range of from 0.855 to 0.900 g/cm³. All individual values and subranges from 0.855 to 0.900 g/cm³ are included herein and disclosed herein; for example, the density can range from a lower limit of 0.855, 0.86, 0.865, 0.87, 0.875, 0.88, 0.885, 0.89, or 0.895 g/cm³ to an upper limit of 0.86, 0.865, 0.87, 0.875, 0.88, 0.885, 0.89, 0.895, or 0.900 g/cm³. For example, the density of the anhydride and/or carboxylic acid functionalized ethylene/α-olefin interpolymer may be from 0.855 to 0.900 g/cm$^3$, or in the alternative, the density of the anhydride and/or carboxylic acid functionalized ethylene/α-olefin interpolymer may be from 0.855 to 0.875 g/cm$^3$, or in the alternative, the density of the anhydride and/or carboxylic acid functionalized ethylene/α-olefin interpolymer may be from 0.875 to 0.900 g/cm$^3$, or in the alternative, the density of the anhydride and/or carboxylic acid functionalized ethylene/α-olefin interpolymer may be from 0.865 to 0.895 g/cm$^3$.

The anhydride and/or carboxylic acid functionalized ethylene/α-olefin interpolymer has a melt index, $I_2$, (190° C./2.16 kg) of greater than or equal to 200 g/10 min. All individual values and subranges from greater than or equal to 200 g/10 min are included herein and disclosed herein. For example, the anhydride and/or carboxylic acid functionalized ethylene/α-olefin interpolymer can have a melt index (190° C./2.16 kg) of greater than or equal to 200 g/10 min, or in the alternative, the anhydride and/or carboxylic acid functionalized ethylene/α-olefin interpolymer can have a melt index (190° C./2.16 kg) of greater than or equal to 300 g/10 min, or in the alternative, the anhydride and/or carboxylic acid functionalized ethylene/α-olefin interpolymer can have a melt index (190° C./2.16 kg) of greater than or equal to 400 g/10 min, or in the alternative, the anhydride and/or carboxylic acid functionalized ethylene/α-olefin interpolymer can have a melt index (190° C./2.16 kg) of greater than or equal to 500 g/10 min, or in the alternative, the anhydride and/or carboxylic acid functionalized ethylene/α-olefin interpolymer can have a melt index (190° C./2.16 kg) of greater than or equal to 600 g/10 min. In one embodiment, the anhydride and/or carboxylic acid functionalized ethylene/α-olefin interpolymer has a melt index ($I_2$), or calculated melt index ($I_2$), less than, or equal to, 1500 g/10 min, further less than, or equal to, 1200 g/10 min, and more further less than, or equal to, 1000 g/10 min.

Ethylene Vinyl Alcohol

The second layer comprises from 60 to 95 percent by weight of an ethylene vinyl alcohol polymer (EVOH). All values and subranges from 60 to 95 percent by weight are included herein and disclosed herein; for example, the amount of EVOH in the second layer can be from a lower limit of 60, 65, 70, 75, 80 85, or 90 percent by weight to an upper limit of 65, 70, 75, 80, 85, 90 or 95 percent by weight. For example, the second layer may comprise from 60 to 95 percent by weight EVOH, or in the alternative, the second layer may comprise at from 60 to 80 percent by weight EVOH, or in the alternative, the second layer may comprise from 80 to 95 percent by weight EVOH, or in the alternative, the second layer may comprise from 75 to 85 percent by weight EVOH.

The EVOH may have an ethylene content of about 28%, or at least about any of the following values: 20%, 25%, 30%, and 38% by weight. EVOH may have an ethylene content of at most about any of the following values: 50%, 48%, 40%, 35%, and 33% by weight. EVOH may include saponified or hydrolyzed ethylene/vinyl acetate copolymers, such as those having a degree of hydrolysis of at least about any of the following values: 50% and 85%. Exemplary EVOH is commercially available from Evalca Corporation having ethylene contents of 29, 32, 35, 38 and 44 mole percent. As is generally known in the art, lower ethylene content in the EVOH polymers corresponds to improved barrier properties. To one skilled in the art the selection of the particular level of ethylene in the EVOH polymer is not peculiar to the invention since it is well known that the selection is dictated by the ultimate target barrier properties desired whereby the lower ethylene containing EVOH polymers possess improved barrier properties.

It is also contemplated that two or more different EVOH polymers as described herein may be used in the second layer.

Tie Layer

One or more tie layers are optionally used between any layers of the multilayer structure of the invention, particularly any layers that have less than the desired adhesion to each other without the tie layer. Tie layers are within the skill in the art. Their composition is determined by that of the immediately adjacent layers such that the tie layer adheres to each immediately adjacent layer. Functional polymers of a maleic anhydride grafted (MAH) polymer are used in tie layers of polyolefin adjacent to EVOH or Polyamide. Polymers comprising ethylene/vinyl acetate copolymer (EVA) are also used in tie layers adjacent polyvinylidene chloride. The vinyl acetate derived units may be present in amounts of about 12 to 35 weight percent for tie layer applications. Some non-limiting examples of suitable polymers for the tie layer include ethylene/vinyl acetate copolymers, ethylene/methyl acrylate copolymers, ethylene/butyl acrylate copolymers, linear low density polyethylene (LLDPE), very low density polyethylene (VLDPE), ultralow density polyethylene (ULDPE), TAFMER resins (commercially available from Mitsui Chemical Company), as well as metallocene catalyzed ethylene/alpha-olefin copolymers of lower densities.

Those skilled in the art will recognize that in particular embodiments one or more other layers within the skill in the art, for instance a strengthening layer, bulk layer, stiffening layer or the like or combination thereof are optionally included in a multilayer film of the invention.

Additives

Either the first or second layer or any component thereof may optionally contain one or more additives, such as mineral oil or other plasticizers. Other additives generally known in the art include materials such as inorganic fillers, conductive fillers, pigments, nucleators, clarifiers, antioxidants, acid scavengers, oxygen scavengers, flame retardants, ultraviolet absorbers, processing aids such as zinc stearate, extrusion aids, slip additives, permeability modifiers, antistatic agents, antiblock additives and other thermoplastic polymers. The use of oxygen scavengers may be particularly preferred as such materials may enhance the oxygen barrier properties of the films.

Films and Articles

In a particular embodiment of the inventive multilayer film, the second layer represents from 2 to 15% of a total thickness of the multilayer film. All individual values and subranges from 2 to 15% are included herein and disclosed herein; for example, the second layer may represent a percentage thickness of the total multilayer film thickness from a lower limit of 2, 4, 6, 8, 10, 12 or 14% to an upper limit of 3, 5, 7, 9, 11, 13 or 15%. For example, the second layer can be from 2 to 15% of the total film thickness, or in the alternative, from 2 to 10%, or in the alternative, from 5 to 15%, or in the alternative, from 4 to 15%, or in the alternative, from 6 to 9%, or in the alternative, from 4 to 12%.

The films of the present invention are multilayer films comprising two or more additional layers. Such additional layers, when present, may be selected to provide additional functionality as is generally known in the art. When the film comprises 3 or more layers it is generally preferred that the barrier layer (second layer) comprise an internal (core layer) of the film.

The additional layers may advantageously comprise a polymeric material selected from the group consisting of propylene based plastomers or elastomers, propylene homopolymers, MDPE, HDPE, LLDPE, LDPE, ethylene based plastomers or elastomers or blends thereof.

The multilayer films of the present invention preferably have a total thickness, in the range of from 10 µm to 400 µm, more preferably from 15 µm to 250 µm, more preferably from 25 µm to 200 µm, still more preferably from 50 to 100 µm.

The films can be formed using any process generally known in the art including blown films and cast films, in which the individual layers can be coextruded.

Of particular interest for some applications, the films may be oriented in the machine direction or the cross direction, or both the machine and cross direction following the film forming step.

In one embodiment, the multi-layer film further comprises two external skin layers to form a three layer structure. The three layer structure, A/C/E would have the following structure: layer A is the first layer as described herein and in this structure is an external layer; layer C is the second layer as described herein; and layer E is a second external layer.

In a specific embodiment, the skin layer comprises an ethylene-based polymer. In another embodiment, the skin layer comprises an ethylene/α-olefin interpolymer composition having a Comonomer Distribution Constant (CDC) in the range of from 75 to 200; a zero shear viscosity ratio (ZSVR) of at least 2; a density in the range of from 0.865 to 0.930 g/cm$^3$, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons.

In yet another embodiment, the multi-layer film further comprises two external layers and two tie layers. In a specific embodiment, the tie layer comprises a maleic anhydride grafted polyethylene like AMPLIFY resins available from The Dow Chemical Company or competitive PLEXAR resins available from LyondellBasell, to form a five layer structure. The five layer structure, A/B/C/D/E would have the following structure: layer A is the first layer as described herein and in this structure is an external layer; layers B and D are tie layers; layer C is the second layer as described herein; and layer E is a second external layer.

The films disclosed herein provide a balance of elastic and barrier properties. As is well known in the art, improvement of elastic properties generally results in degradation of barrier properties and vice versa. However, the inventive films provide an improvement in elastic properties without degradation in barrier properties.

In another embodiment, the invention provides an article comprising the multi-layer film in accordance with any of the embodiments disclosed herein. In one embodiment, the article is a stretch hood. In an alternative embodiment, the article is a stretch sleeve. In another embodiment, the article is a flexible barrier packaging materials and formats, such as bags, flowpacks and four corner, pillow and stand-up pouches. The articles of the present invention can be used for the packaging of liquids, solids and/or particulates, such as beverages, foods, cosmetics, and medicines.

Examples

In order to demonstrate the effectiveness of the present invention a series of multi-layer films were made. The target structures are prepared by first compounding the anhydride and/or carboxylic acid functionalized ethylene/α-olefin interpolymer into the EVOH using a range of EVOH grades, modifier grades, and processing conditions. In some cases, the anhydride and/or carboxylic acid functionalized ethylene/α-olefin interpolymer is dry blended with the EVOH. Three different types of EVOH polymers are examined. EVOH 1 contains 32 mol % ethylene, EVOH 2 contains 38 mol % ethylene and EVOH 3 contains 44 mol % ethylene. In this study (see table below) all EVOH polymers are supplied by Kuraray America, Inc. and sold under the trade name of EVAL* polymers. The anhydride and/or carboxylic acid functionalized ethylene/α-olefin interpolymer (when present) used in the Examples is prepared as follows:

Synthesis of Reactive Modifier:

The following materials are used to make the reactive modifier used in the Examples:

Base resin: Low molecular weight ethylene-octene copolymer, nominally 1250 g/10 min MI, 0.87 g/cc density ethylene-octene copolymer.

Maleic Anhydride (MAH);

DHBP (2,5 dimethyl-2,5 di-tertbutyl peroxy) hexane, commercially available from Evonik-DeGussa, or equivalent;

HYDROBRITE 380: —hydrotreated paraffinic oil to dilute peroxide as needed. (1:1 ratio of peroxide:oil), commercially available from Ruger Chemical Company; and Peroxide: LUPEROX 101—2,5-Bis(tert-butylperoxy)-2,5-dimethylhexane (290.44 g/mol), commercially available from Arkema, Inc.

The anhydride and/or carboxylic acid functionalized ethylene/α-olefin interpolymer is made using a "92 mm" co-rotating twin screw extruder (TSE). The process is summarized in the following steps: (a) base resin polymer pellets are fed into the extruder hopper of the extruder by a gravimetrically, controlled auger feeder, at the desired polymer feed rate; (b) molten MAH is injected into the barrel; (c) peroxide is added via a 1:1 mineral oil solution, at a target feed rate, and injected into the barrel, downstream from the MAH; (d) kneading blocks distribute the reactive ingredients and heated the polymer melt through mechanical energy dissipation, and the reaction occurs following thermal decomposition of peroxide initiator; (e) volatile unreacted components and byproducts are removed at a vacuum port;

(f) the melt is cooled in the final barrel section and is fed to a gear pump; (g) the gear pump feeds a die, from which the melt goes to an underwater pelletizer. A pellet slurry cooling line of sufficient length is used to achieve residence time greater than 60 seconds, to cool pellets to less than 25° C. The pelletized product is dried and collected.

Once the anhydride and/or carboxylic acid functionalized ethylene/α-olefin interpolymer has been made a series of EVOH resins compounded with the reactive modifier is prepared using a large scale Century-ZSK-40 37.12L/D extruder with 9 barrels using a mixing screw design. The underwater diverter valve assembly is equipped with a 6 hole (3.175 mm hole diameter) under water die. The pelletizer has a 4 blade hub. The run has nitrogen in barrel 4 of the extruder. The first barrel section is set at 25° C. whereas the remaining barrel zones are set between 25° C. and 225° C. The screw speed is set at 220 rpm and the material is fed at 68 kg/hr. This results in melt temperatures between 220-229° C. The material is underwater pelletized used a Gala underwater pelletizer.

After compounding the polymers are stored in moisture proof bags and further they are dried prior to the blown film fabrication step. The samples are dried using a hot air recirculation oven using the recommended drying temperatures for EVOH.

Coextruded 5 layer film samples are produced on an Alpine 7-Layer blown film. The individual feed lines are all 50 mm 30:1 L/D grooved feed extruders where each extruder was fed from a 4 component blender. The film thickness is maintained using an auto profile air ring system and an IBC.

Comparative Example 1 and Inventive Examples 1-3

5 layer films, having the structure shown in Table 1, are produced using an Alpine line, Hosokawa Alpine Corporation, with a target structure of 34 micron thickness. Layer "C" is either 100% EVOH2 in Comparative Example 1, or compounds of the anhydride and/or carboxylic acid functionalized ethylene/α-olefin interpolymer at 10% by weight with the balance EVOH, for the inventive examples, as shown in Table 2. All of the compounds were prepared using the single screw compounding line.

TABLE 1

| Layer | Structure |
|---|---|
| A | 20.4% Polyethylene (0.917 density, 0.8 MI) |
| B | 6.6% PE based tie layer (0.920 density, 1 MI) |
| C | 5.5% EVOH (pure or compounded with reactive modifier) |
| D | 6.6% PE based tie layer (0.920 density, 1 MI) |
| E | 20.4% Polyethylene (0.917 density, 0.8 MI) |

Table 2 provides a comparison between selected physical properties of Comparative Example 1 and Inventive Examples 1-3. The MD Elmendorf tear is nearly doubled from 665 to 1289 grams and yield a 15% improvement in Dart performance (292 to 340 grams).

TABLE 2

| Property | ASTM Method | Inventive Example 2 (Layer C = 90% EVOH2) | Inventive Example 3 (Layer C = 90% EVOH3) | Inventive Example 1 (Layer C = 90% EVOH1) | Comparative Example 1 (Layer C = 100% EVOH2) |
|---|---|---|---|---|---|
| Dart, grams (g) | D1709 | 340 | 322 | 247 | 292 |
| Secant Modulus CD at 1%, psi | D 882 | 50566 | 50263 | 52662 | 57332 |
| Secant Modulus MD at 1%, psi | D 882 | 46363 | 45791 | 50767 | 51789 |
| Elmendorf Tear CD, grams (g) | D 1922 | 1795 | 1564 | 2064 | 1607 |
| Elmendorf Tear MD, grams (g) | D 1922 | 1289 | 1147 | 1228 | 665 |

Table 3 illustrates the results of oxygen transmission rates for Comparative Film Example 1 and Inventive Film Example 2. As can be seen from Table 3, Comparative Film Example 1, which contained no anhydride and/or carboxylic acid functionalized ethylene/alpha-olefin interpolymer and contained 100% EVOH2 in Layer C, showed a large increase in oxygen transmission rate following 100% strain. In contrast Inventive Film Example 2, which contained 10% anhydride and/or carboxylic acid functionalized ethylene/ alpha-olefin interpolymer and 90% EVOH2 in Layer C showed no significant increase in oxygen transmission rate following 100% strain.

TABLE 3

| | Oxygen Transmission OTR [cc-mil/(100 in$^2$-day)] | |
|---|---|---|
| Film Example | Initial | 100% Strain |
| Comparative Film Ex. 1 | 1.75 | 5.0 |
| Inventive Film Ex. 2 | 2.60 | 2.85 |

Inventive Film Ex. 4-5 and Comparative Film Ex. 2

5-layer films, Inventive Film Ex. 4-5 and Comparative Film Ex. 2, are produced using the Alpine line with a target structure of 109 micron (4.3 mil) thickness. See Table 4. Comparative Film Ex. 2 has 100% EVOH1 in layer C. Layer C of each of Inventive Film Ex. 4-5 has an anhydride and/or carboxylic acid functionalized ethylene/α-olefin interpolymer at 10 wt % and 5% by weight, respectively, with the balance being EVOH1. The reactive modifier in layer C was either compounded (Inv. Film Ex. 4) or dry blended (Inv. Film Ex. 5).

TABLE 4

| Layer | Amt. | Thickness (micron) | Comparative Film Ex. 2 no modifier | Inventive Film Ex. 4 10% modifier (layer C precompounded) | Inventive Film Ex. 5 5% modifier (layer C dry blended) |
|---|---|---|---|---|---|
| A | 10.0% | 10.9 | Polyethylene A | Polyethylene A | Polyethylene A |
| B | 8.0% | 8.7 | PE based tie resin A | PE based tie resin A | PE based tie resin A |
| C | 4.0% | 4.4 | 100% EVOH1 | 90% EVOH1 + 10% reactive modifier | 95% EVOH1 + 5% reactive modifier |
| D | 8.0% | 8.7 | PE based tie resin A | PE based tie resin A | PE based tie resin A |
| E | 70.0% | 76.2 | Polyethylene B | Polyethylene B | Polyethylene B |

Polyethylene A is a linear low density polyethylene having a density of 0.92 g/cc and an $I_2$ of 1.0 g/10 min.

Polyethylene B is a linear low density ethylene-octene copolymer having a density of 0.907 g/cc and an $I_2$ of 0.85 g/10 min.

PE based tie resin A is a maleic anhydride grafted (MAH) polymer having a density of 0.910 g/cc and an $I_2$ of 1.7 g/10 min.

As can be seen from Table 5, Comparative Film Ex. 2 showed the lowest Elastic Recovery for both 55% and 60% strain. In contrast, Inv. Film Ex. 4-5 showed that the higher the content of the reactive modifier, the higher the Elastic Recovery.

TABLE 5

| Film Example | Elastic Recovery (%) | |
|---|---|---|
| | At 55% Strain | At 60% Strain |
| Comparative Film Ex. 2 | 74.88 | 72.65 |
| Inventive Film Ex. 4 | 77.28 | 75.74 |
| Inventive Film Ex. 5 | 75.99 | 73.60 |

Inventive Film Ex. 6-8 and Comparative Film Ex. 3

5-layer structures are produced using the Alpine line. For each of Inventive Film Ex. 6-8, Layer C contains 10 wt % of an anhydride and/or carboxylic acid functionalized ethylene/α-olefin interpolymer dry blended with EVOH3. Comparative Film Ex. 3 has 100% EVOH3 in layer C. See Tables 6-9.

Polyolefin Plastomer A has a density of 0.902 g/cc and an I2 of 1.0 g/10 min;

Polyethylene C has a density of 0.912 g/cc and an I2 of 0.8 g/10 min; and

Polyethylene D has a density of 0.905 g/cc and an I2 of 0.8 g/10 min.

PE based tie resin B is a maleic anhydride grafted (MAH) polymer having a density of 0.875 g/cc and an $I_2$ of 1.3 g/10 min.

EVOH1 is an EVOH-based resin containing 32 mole % ethylene, which is commercially available from Kuraray under the name EVAL F171.

EVOH2 is an EVOH-based resin containing 38 mole % ethylene, which is commercially available from Kuraray under the name EVAL H171.

EVOH3 is an EVOH-based resin containing 44 mole % ethylene, which is commercially available from Kuraray under the name EVAL E171.

TABLE 6

| | | | Inventive Film Ex. 6 |
|---|---|---|---|
| Layer | Amt | Thickness (micron) | 10% modifier (layer C dry blended) |
| A | 37.0% | 18.8 | 72% Polyolefin Plastomer A + 28% Polyethylene C |
| B | 10.0% | 5.1 | 85% Polyethylene D + 15% PE based tie resin B |
| C | 6.0% | 3.0 | 90% EVOH3 + 10% reactive modifier |
| D | 10.0% | 5.1 | 85% Polyethylene D + 15% PE based tie resin B |
| E | 37.0% | 18.8 | 72% Polyolefin Plastomer A + 28% Polyethylene C |

TABLE 7

| | | | Inventive Film Ex. 7 |
|---|---|---|---|
| Layer | Amt | Thickness (micron) | 10% modifier (layer C dry blended) |
| A | 35.0% | 17.8 | 72% Polyolefin Plastomer A + 28% Polyethylene C |
| B | 10.0% | 5.1 | 85% Polyethylene D + 15% PE based tie resin B |
| C | 10.0% | 5.1 | 90% EVOH3 + 10% reactive modifier |
| D | 10.0% | 5.1 | 85% Polyethylene D + 15% PE based tie resin B |
| E | 35.0% | 17.8 | 72% Polyolefin Plastomer A + 28% Polyethylene C |

TABLE 8

| | | | Inventive Film Ex. 8 |
|---|---|---|---|
| Layer | Amt | Thickness (micron) | 10% modifier (layer C dry blended) |
| A | 37.0% | 31.0 | 72% Polyolefin Plastomer A + 28% Polyethylene C |
| B | 10.0% | 8.4 | 85% Polyethylene D + 15% PE based tie resin B |
| C | 6.0% | 5.0 | 90% EVOH3 + 10% reactive modifier |
| D | 10.0% | 8.4 | 85% Polyethylene D + 15% PE based tie resin B |
| E | 37.0% | 31.0 | 72% Polyolefin Plastomer A + 28% Polyethylene C |

TABLE 9

Comparative Film Ex. 3

| Layer | Amt | Thickness (micron) | No modifier layer C |
|---|---|---|---|
| A | 37.0% | 31.0 | 72% Polyolefin Plastomer A + 28% Polyethylene C |
| B | 10.0% | 8.4 | 85% Polyethylene D + 15% PE based tie resin B |
| C | 6.0% | 5.0 | 100% EVOH3 |
| D | 10.0% | 8.4 | 85% Polyethylene D + 15% PE based tie resin B |
| E | 37.0% | 31.0 | 72% Polyolefin Plastomer A + 28% Polyethylene C |

As is well known in the art, improvement of elastic properties generally results in degradation of barrier properties and vice versa. However, the inventive films provide an improvement in elastic properties without degradation in barrier properties. The inventive films provide a balance of elastic and barrier properties and can be optimized as shown in Inventive Film Ex. 8. As can be seen from Table 10, Inventive Film Ex. 8 shows the better combination of high barrier to gases (weight ratio of EVOH) and high Elastic Recovery. Inventive Film Ex. 6 has slightly lower Elastic Recovery but it has much lower barrier to gases compared to Inventive Film Ex. 8. Inventive Film Ex. 7 has equivalent barrier to gases but much lower Elastic Recovery compared to Inventive Film Ex. 8.

TABLE 10

| | Elastic Recovery (%) | |
|---|---|---|
| Film Example | At 55% Strain | At 60% Strain |
| Inventive Film Ex. 6 - 3 micron layer C thickness (50 micron total thickness) | 82.15 | 80.10 |
| Inventive Film Ex. 7 - 5 micron layer C thickness (50 micron total thickness) | 78.07 | 78.33 |
| Inventive Film Ex. 8 - 5 micron layer C thickness (84 micron total thickness) | 82.45 | 81.48 |

Table 11 compares the Stretch Hood Elastic Recovery and Elmendorf Tear Resistance of Comparative Film Example 3 and Inventive Example 8. The Inventive Film Example 8 shows higher Stretch Hood Elastic Recovery and more than 10× improvement of the MD Tear properties (from 253 to 2676 gram) compared to the Comparative Example without the reactive modifier.

TABLE 11

| | | Elastic Recovery (%) | |
|---|---|---|---|
| Film Example | Elmendorf Tear Resistance (MD) (grams) | Stretch Hood 60/40 | Stretch Hood 100/75 |
| Comparative Film Ex. 3 - 5 micron layer C thickness (84 micron total thickness) | 253 | 44.4 | 37.6 |
| Inventive Film Ex. 8 - 5 micron layer C thickness (84 micron total thickness) | 2676 | 49.7 | 38.5 |

Comparative Film Ex. 3 and Inventive Film Ex. 8 were further tested as follows:

Using the stretch hooder, strips of these films were stretched at different stretching percentages, as shown in Table 12, wherein failed indicates that the film tore and pass indicates that the film did not tear.

TABLE 12

| | stretching % | | | |
|---|---|---|---|---|
| | 15-20% | 30% | 73% | 92% |
| Comparative Film 3 | Failed | Failed | — | failed |
| Inventive Film 8 | — | Pass | Pass | Pass |

Additional examples were made for evaluation for use in non-film applications. For liquid packaging structure use, Table 13 shows the structure of the examples investigated. The additive in Table 13 is an ultra-low viscosity maleic anhydride-coupled ultra-low density polymer is produced by maleic anhydride (MAH) coupling of an ethylene/1-octene copolymer having melt index of 1250 g/10 min (calculated value from viscosity) and a density of 0.870 g/cc to produce a grafted polymer with nominally 1.1% bound MAH and a melt index of 600 g/10 min.

TABLE 13

| Layer ratio | Thickness (mils) | Comp. Ex. 4 | Inv. Ex. 9 | Inv. Ex. 10 |
|---|---|---|---|---|
| 10.0% | 0.4 | 72% Polyolefin Plastomer A + 28% Polyethylene C | 72% Polyolefin Plastomer A + 28% Polyethylene C | 72% Polyolefin Plastomer A + 28% Polyethylene C |
| 8.0% | 0.3 | 85% Polyethylene D + 15% PE based tie resin B | 85% Polyethylene D + 15% PE based tie resin B | 85% Polyethylene D + 15% PE based tie resin B |
| 4.0% | 0.2 | EVOH1 | 95% EVOH1 + 5% additive | 95% EVOH2 + 5% additive |
| 8.0% | 0.3 | 85% Polyethylene D + 15% PE based tie resin B | 85% Polyethylene D + 15% PE based tie resin B | 85% Polyethylene D + 15% PE based tie resin B |
| 70.0% | 3.0 | 72% Polyolefin Plastomer A + 28% Polyethylene C | 72% Polyolefin Plastomer A + 28% Polyethylene C | 72% Polyolefin Plastomer A + 28% Polyethylene C |

The oxygen transmission rate of Comp. Ex. 4 and Inv. Ex. 9-10 was measured following Gelbo-Flex testing. The results are shown in Table 14.

TABLE 14

| OTR (OTR (cc/ [100 in2-day]) | Comparative Example 4 | Inventive Ex. 9 | Inventive Ex. 10 |
|---|---|---|---|
| After 0 Gelbo-Flex cycles | 0.361 | 0.407 | 0.558 |
| After 1000 Gelbo-Flex cycles | 0.460 | 0.957 | 1.025 |
| After 2000 Gelbo-Flex cycles | >13 | 0.780 | 1.085 |
| After 3000 Gelbo-Flex cycles | >13 | 1.206 | 1.193 |

As can be seen in Table 14, the increase in OTR of Inv. Ex. 9 and 10 is significantly less after 200 and 300 Gelbo-Flex cycles than seen in Comp. Ex. 4.

Test Methods

Test methods include the following:

Elastic Recovery (at 55% and 60% strain) was measured according to ASTM D5459.

Elastic Recovery (60/40 and 100/75) was measured according to ASTM D4649

Oxygen Transmission Rate was measured according to ASTM D 3985.

Dart was measured according to ASTM D 1709.

Secant Modulus CD and MD were measured according to ASTM D 882.

Elmendort Tear CD and MD were measured according to ASTM D 1922.

Polymer density was measured according to ASTM D 792.

Melt index ($I_2$, or MI) of an ethylene-based polymer is measured in accordance with ASTM D-1238, condition 190° C./2.16 kg. For high $I_2$ polymers ($I_2$ greater than, or equal to, 200 g/10 min, melt index is preferably calculated from Brookfield viscosity as described in U.S. Pat. Nos. 6,335,410; 6,054,544; 6,723,810. $I_2$ (190° C./2.16 kg)=3.6126[10 $(\log(\eta)-6.6928)/-1.1363]-9.31851$, where $\eta$=melt viscosity, in cP, at 350° F.

A Gelbo-Flex tester is used to simulate the stresses placed on liquid packaging to simulate what such packages experiences during the handling and transportation steps from the film fabrication to the final consumer. For liquid packaging it is desirable to maintain good oxygen barrier after at least 2000 (3000 is preferred) Gelbo-flex cycles.

The present invention may be embodied in other forms without departing from the spirit and the essential attributes thereof, and, accordingly, reference should be made to the appended claims, rather than to the foregoing specification, as indicating the scope of the invention.

We claim:

1. A multilayer film comprising:
   (1) a first layer comprising
      from greater than 0 to 100 percent by weight of the first layer of an ethylene/α-olefin interpolymer composition, based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index (I2) in a range of from 0.1 to 5 g/10 minutes, less than 120 total unsaturation units/1,000,000 carbons, and long chain branching frequency in the range of 0.01 to 3 long chain branches (LCB) per 1000 carbons; and
   (2) a second layer comprising:
      from 5 to 10 percent, by weight of the second layer, of a maleic anhydride functionalized ethylene/alpha-olefin interpolymer having a density in the range of from 0.855 to 0.900 g/cm³, a melt index (190° C./2.16 kg) of greater than 200 g/10 min; and from 80 to 95 percent, by weight of the second layer, of ethylene vinyl alcohol (EVOH) including 32 mol % to 44 mol % of ethylene, wherein the second layer represents from 2 to 10% of a total thickness of the multilayer film.

2. The multilayer film according to claim 1 further comprising at least one tie layer between the first and second layer.

3. The multilayer film according to claim 2, wherein the tie layer comprises at least one component selected from the group consisting of ethylene/vinyl acetate copolymers, ethylene/methyl acrylate copolymers, ethylene/butyl acrylate copolymers, linear low density polyethylene (LLDPE), very low density polyethylene (VLDPE), and ultralow density polyethylene (ULDPE).

4. The multi-layer film according to claim 2, further comprising two skin layers.

5. The multi-layer film according to claim 4, wherein at least one of the two skin layers comprises an ethylene-based polymer.

6. The multi-layer film according to claim 4, wherein at least one of the two skin layers comprises an ethylene/α-olefin interpolymer composition having a Comonomer Distribution Constant (CDC) in the range of from 75 to 200; a zero shear viscosity ratio (ZSVR) of at least 2; a density in the range of from 0.865 to 0.930 g/cm₃, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons.

7. The multilayer film according to claim 1, wherein the first layer further comprises from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

8. The multi-layer film according to claim 1, wherein the film exhibits no greater than a 20% increase in oxygen transmission rate upon 100% pre-stretch.

9. An article comprising the multi-layer film according to claim 1.

10. The article according to claim 9, wherein the article is a stretch hood.

11. The article according to claim 9, wherein the article is a stretch sleeve.

12. The article according to claim 9, wherein the article is a flexible package.

13. A multilayer film comprising:
   (1) a first layer comprising
      from greater than 0 to 100 percent by weight of the first layer of an ethylene/α-olefin interpolymer composition, based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (2) a second layer comprising:
   from 5 to 10 percent, by weight of the second layer, of an ultra-low viscosity maleic anhydride-grafted ultra-low density ethylene/alpha-olefin having from 0.5 to 2% bound maleic anhydride and a melt index of from 200 to 1000 g/10 min; and from 90 to 95 percent, by weight of the second layer, of ethylene vinyl alcohol (EVOH) including 32 mol % to 44 mol % of ethylene, wherein the second layer represents from 2 to 10% of a total thickness of the multilayer film.

* * * * *